Patented Mar. 18, 1952

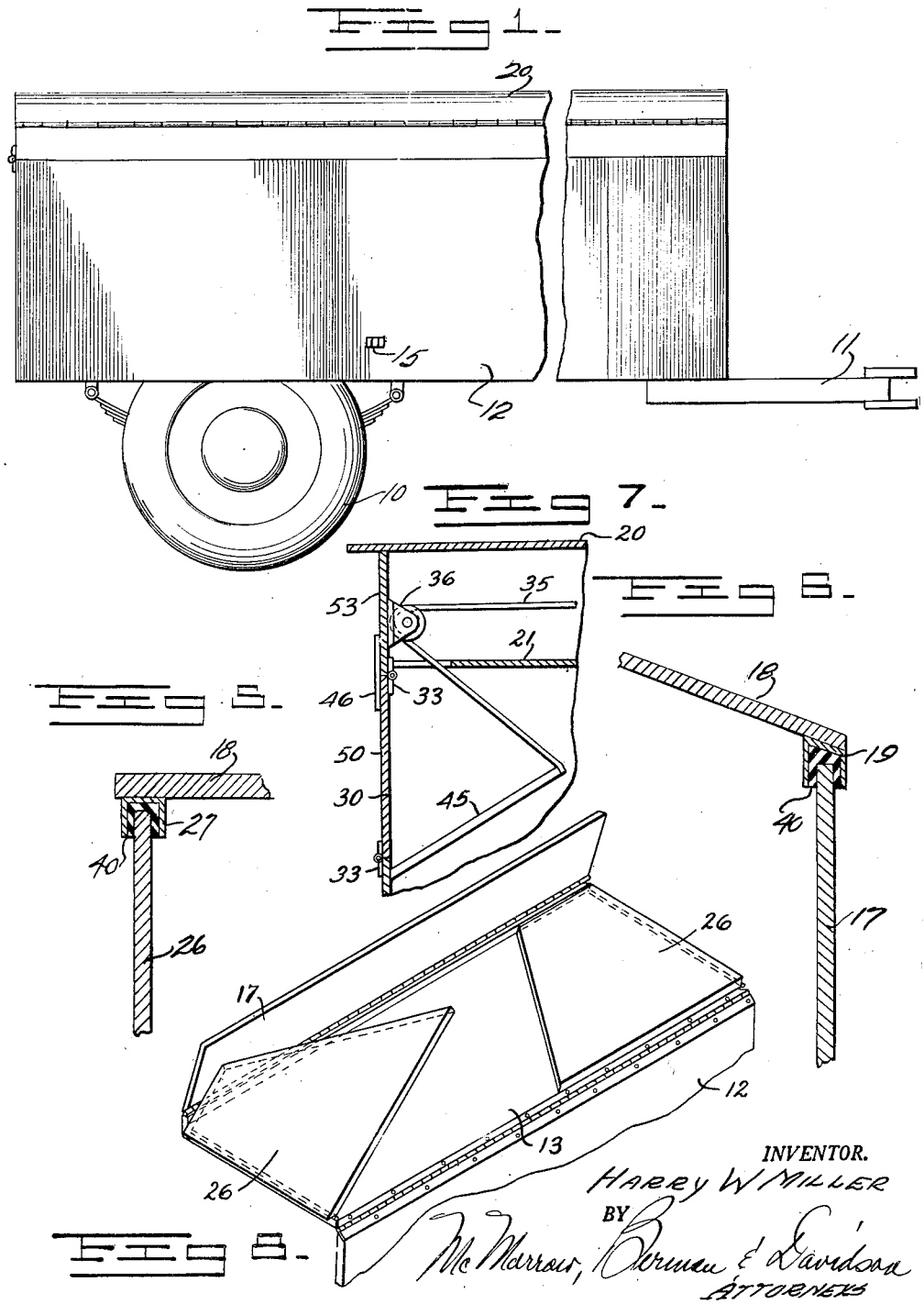

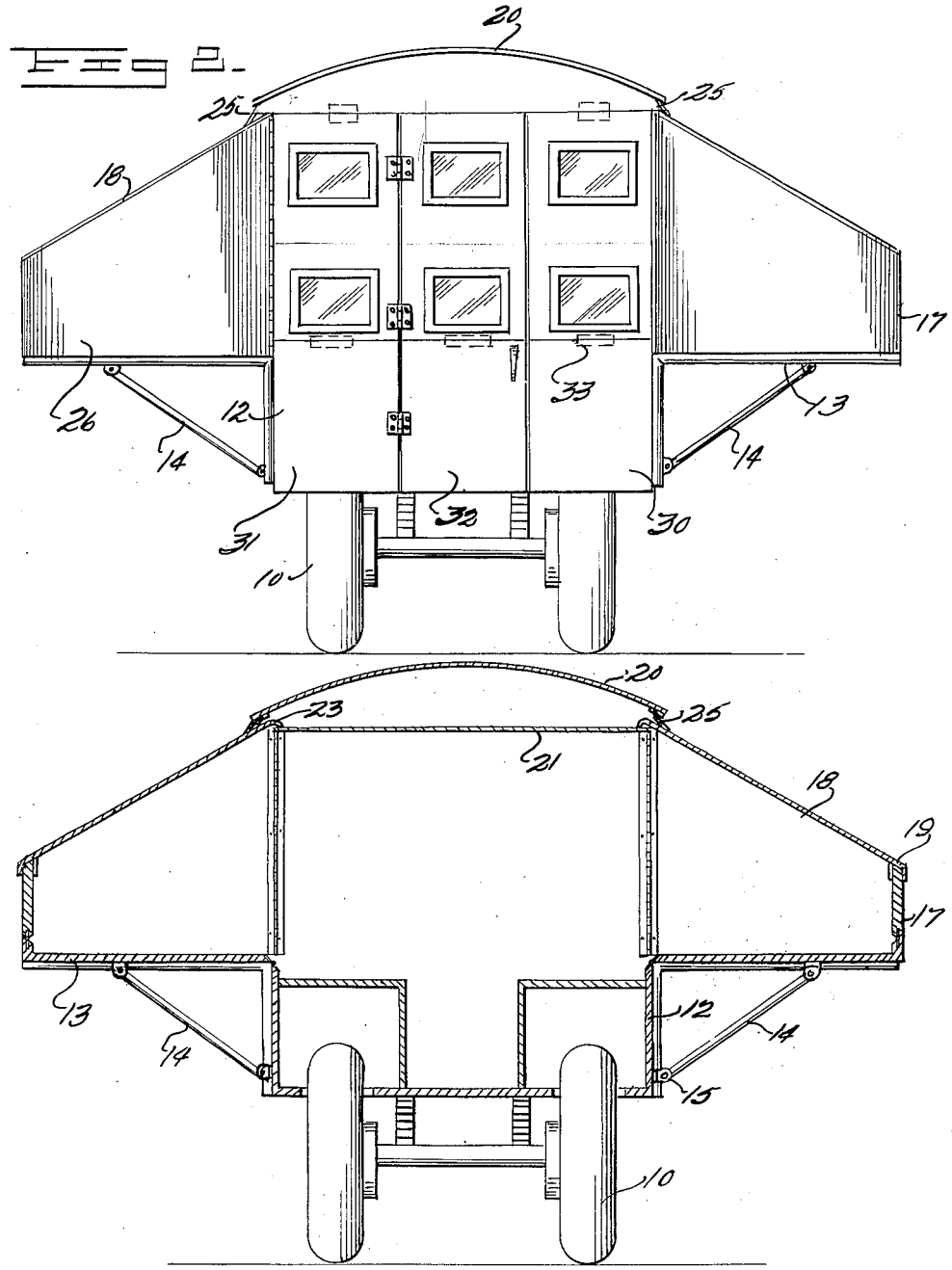

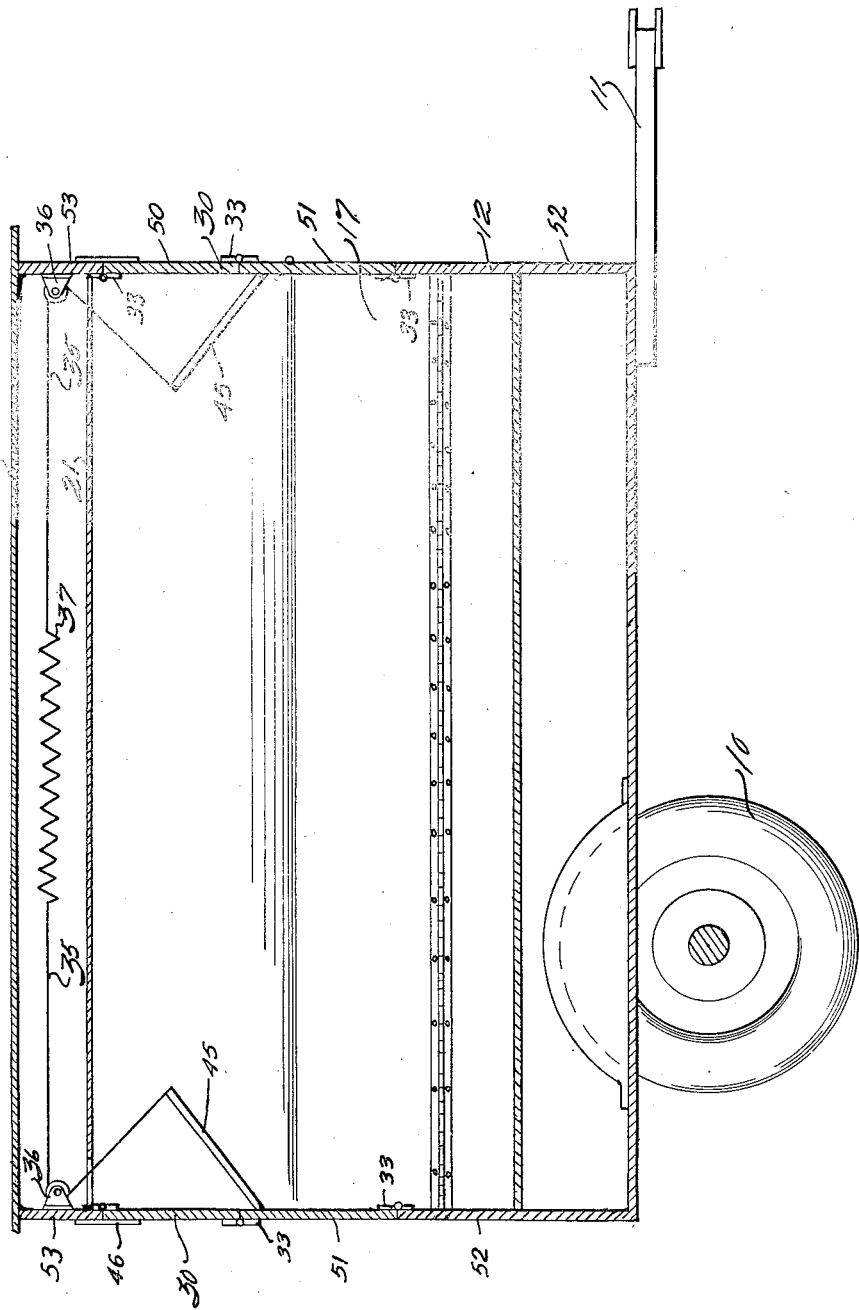

2,589,416

UNITED STATES PATENT OFFICE 2,589,416

COLLAPSIBLE VEHICLE BODY

Harry W. Miller, Samoa, Calif.

Application May 2, 1947, Serial No. 745,605

2 Claims. (Cl. 296—23)

This invention relates to dwellings and other structures, and has particular reference to a collapsible trailer.

A prime object of the invention is to provide a structure that is collapsible to compact form for the purpose of storage or mobility, and that can be quickly and easily erected to serve as a house.

While this specification will hereinafter refer to mobile house trailers, it is understood that garages, barns, warehouses, and other structures are likewise contemplated.

The accompanying drawings illustrate a preferred embodiment of the invention.

Figure 1 is a side elevation of the collapsed trailer.

Figure 2 is a rear elevation of the erected trailer.

Figure 3 is a vertical section of the erected trailer from the rear of the structure.

Figure 4 is a vertical section of the erected trailer from the side of the structure.

Figures 5 and 6 are vertical sections through various joints of the trailer components.

Figure 7 is an enlarged detail of a fragment of the vertical section of the erected trailer shown in Figure 4.

Figure 8 is a perspective detailed view of one of the bed plates and complemental end members and side in semi-unassembled position.

The trailer is preferably fabricated of metal panels, but it is apparent that plywood, plastic, or other suitable materials may be utilized. Two wheels 10 are shown, as well as an attaching tongue 11, but jacks or a greater or smaller number of wheels may be substituted, and in fact the device may be employed as a non-mobile structure. The body 12 constitutes a support for all the other members, which are movable with respect thereto. The size will depend on the purpose for which it is to be used.

The trailer will first be described with reference to its erected position, shown more particularly in Figures 2 and 3.

A bed plate 13 is hinged to the top of the body 12, so as to swing outwardly therefrom. There may be two or more such bed plates 13 on each side, depending on the length of the trailer. Each plate 13 has hinged to it a swinging brace 14, the free end of which is adapted to nest in a socket 15 fixed on the body 12, so that the bed plate 13 may be supported in a horizontal position.

A side 17 is hingedly secured to the extending end of the bed plate 13, with the free end of the side 17 extending upwardly. A top 18 has attached thereto a channel 19 adapted to mate vertically with the free end edge of the side 17. The top 18 is, in the extended position of the trailer, in an inclined position, as illustrated in Figures 2 and 3.

The roof section comprises an upper peaked or curved panel 20 and a lower panel 21 spaced from the upper panel 20, for a purpose to be described more particularly hereinafter. This space is sufficient to accommodate both the tops 18, one on top of the other. The lower panel 21 may take the form of a rail, if desired.

The tops 18 are provided with stops 23 to mesh with the ends of the lower panel or rail 21, to limit the outward movement of the tops 18. A flap 25 of rubber or waterproof fabric is fastened to the underside of the panel 20 and acts to cover the joint between the upper panel 20 and the top 18.

A vertical end member 26 is hinged to the end of each bed plate 13, and the top 18 has an end channel 27 to accommodate the upper portion of the end member 26.

An end panel 30 is provided at each end of the trailer and may include windows 31 and a door 32. Each end panel 30 is formed of four vertical sections 50, 51, 52 and 53. The sections 52 and 53 comprise respectively rigid end walls for the body 12 and the roof 20. The intermediate sections 50 and 51 are hingedly connected together and to the rigid sections 52 and 53 by horizontal sets of hinges so as to provide a toggle-like arrangement to permit collapsing of such end panels in a well-known manner. The lowermost intermediate sections 51 each has fixed thereto an upwardly extending rigid lever 45. The upper end of each lever 45 has secured thereto one end of a cable 35 which extends over a pulley 36 fixed to the rigid end section 53 between the roof 20 and roof panel or rail 21. The opposite ends of the cables 35 are connected together by a tension spring 37 located in the space between the roof 20 and panel or rail 21. The effect of the spring 37 is to load the collapsible sections 51 and 50 in the erected position shown in Figure 4.

Suitable fasteners are provided to maintain the various members secured in either compacted or erected position.

The channels 19 and 27 may be provided with rubber or felt liners 40 for the purpose of weatherproofing the device and of effecting a better closure.

Water compartments, closets, food lockers, and other containers may be located on the trailer in any well-known manner, in such a way as not to interfere with the erection or compacting of the components.

A vertical overlap 46, fixed to the outside of the roof, will seal and protect the ends of the trailer in collapsed position.

To fold the trailer, the tops 18 are released from the sides 17 and ends 26, and are telescoped into the roof, between the panels 20 and 21. Then the ends 26 are folded in on top of the bed plates 13. The sides 17 are then folded inwardly over the ends 26 on the bed plates 13, then the bed plates 13, with the ends 26 and the sides 17 latched thereto, are folded into the trailer body 12. The braces 14 are swung into the trailer along with the bed plates 13. Then the sections 50 and 51 of the end panels 30 are folded inwardly, and this movement is against the force of the spring 37 because the levers 45 are fixed to sections 51. The roof panels 20 and 21 are lowered at the same time. When the roof panels 20 and 21 are completely lowered they are secured to the body 12 by any suitable means, not shown. The result will be a securely-packed trailer occupying a minimum of space, and protected against weather or loss of parts.

To setup the trailer from a compacted position, the top panels 20 and 21 are first released from body 12. Thereafter, the top panels are automatically raised or erected by the spring 37, cables 35 and the levers 45. This results in the end panels 30 being erected to the full line position of Figure 4. Then the bed plates 13 are swung outwardly until they assume a horizontal position, and the braces 14 are set into the sockets 15. The sides 17 are raised to a vertical position, and the ends 26 are similarly erected. The tops 18 are then pulled out from between the roof panels 20 and 21 and mated with the sides 17 and ends 26. After being latched, the trailer will be strong and secure, and ready for occupancy or other intended purpose.

What is claimed is:

1. In a collapsible trailer, a body, a horizontally disposed roof spaced above said body, a pair of upstanding end panels disposed intermediate said roof and said body and each having one end pivotally connected to said body and having the other end connected to said roof, each of said end panels including upper and lower sections disposed in end-to-end relation with respect to each other and pivotally connected together for movement from an extended position in alignment with each other to a retracted position substantially confronting each other, a pair of spaced pulleys disposed in longitudinal alignment and at the same elevation with respect to each other and each supported on said roof contiguous to an end thereof, a cable having an intermediate portion trained over said pair of pulleys and extending horizontally and longitudinally of said roof, a retractile coil spring arranged between said pulleys and connected in said cable, and a lever extending upwardly and inwardly of the pivotal connection of the lower and upper sections of each of said end panels when the end panels are in their extended position and having one end fixedly secured to the lower section below and contiguous to the adjacent pivotal connection and having the other end connected to the adjacent free end of said cable for normally biasing said upper and lower sections into said extended position.

2. In a collapsible trailer, a body, a horizontally disposed roof spaced above said body, a pair of upstanding end panels disposed intermediate said roof and said body and each having one end pivotally connected to said body and having the other end connected to said roof, each of said end panels including upper and lower sections disposed in end-to-end relation with respect to each other and pivotally connected together for movement from an extended position in alignment with each other to a retracted position substantially confronting each other, a pair of spaced pulleys disposed in longitudinal alignment and at the same elevation with respect to each other and each supported on said roof contiguous to an end thereof, a cable having an intermediate portion trained over said pair of pulleys and extending horizontally and longitudinally of said roof, a retractile coil spring arranged between said pulleys and connected in said cable, and means operatively connecting each of the free ends of said cable to the lower section of the adjacent one of said end panels for normally biasing said upper and lower sections into said extended position, said means comprising an inclined lever extending upwardly and inwardly from the lower section of said adjacent one of said end panels and fixedly secured thereto.

HARRY W. MILLER.

REFERENCES CITED

The following references are of record in the file of this patent:

UNITED STATES PATENTS

| Number | Name | Date |
| --- | --- | --- |
| 1,614,598 | Brainard | Jan. 18, 1927 |
| 1,734,803 | Gable | Nov. 5, 1929 |
| 2,155,582 | Bond | Apr. 25, 1939 |
| 2,182,967 | Kors | Dec. 12, 1939 |

FOREIGN PATENTS

| Number | Country | Date |
| --- | --- | --- |
| 461,624 | Great Britain | Feb. 19, 1937 |